United States Patent [19]

Tokieda et al.

[11] Patent Number: 5,173,135
[45] Date of Patent: Dec. 22, 1992

[54] RADIAL TIRE FOR PSSENGER CARS WITH SIDEWALL RUBBER INCLUDING ELECTRICALLY CONDUCTIVE CARBON BLACK

[75] Inventors: Akinori Tokieda, Chigasaki; Tetsuji Kawazura, Hiratsuka, both of Japan

[73] Assignee: The Yokohama Rubber Co., Ltd., Japan

[21] Appl. No.: 794,837

[22] Filed: Nov. 21, 1991

Related U.S. Application Data

[63] Continuation of Ser. No. 670,524, Mar. 18, 1991, abandoned, which is a continuation of Ser. No. 473,171, Jan. 31, 1990, abandoned.

[30] Foreign Application Priority Data

Feb. 1, 1989 [JP] Japan ................................ 1-20880

[51] Int. Cl.⁵ ..................... B60C 13/00; B60C 19/08
[52] U.S. Cl. ............................... 152/152.1; 152/525; 152/DIG. 2
[58] Field of Search ................. 152/524, 525, DIG. 2, 152/152.1, 151, DIG. 4; 524/495, 496; 252/511; 361/212; 428/922

[56] References Cited

U.S. PATENT DOCUMENTS 2,339,546  1/1944  Hanson ...................... 152/DIG. 2
4,642,202  2/1987  Railsback ..................... 524/495 X

FOREIGN PATENT DOCUMENTS 793507  1/1936  France .......................... 152/151

*Primary Examiner*—Geoffrey L. Knable
*Attorney, Agent, or Firm*—Finnegan, Henderson, Farabow, Garrett & Dunner

[57] ABSTRACT

A radial tire for passenger cars constructed with a sidewall portion formed from a rubber composition having of a volume resistivity of not more than $10^4$ $\Omega$cm. The composition is comprised essentially of a selected rubber and a selected carbon black of an electrically conductive type. The tire is highly resistant to staining with mud and dust while in running and also with dirt pickup during storage.

1 Claim, No Drawings

RADIAL TIRE FOR PSSENGER CARS WITH SIDEWALL RUBBER INCLUDING ELECTRICALLY CONDUCTIVE CARBON BLACK

This application is a continuation of application Ser. No. 07/670,524, filed Mar. 18, 1991, now abandoned, which is a continuation of Ser. No. 07/473,171, filed Jan. 31, 1990, now abandoned.

BACKGROUND OF THE INVENTION

1. Field of the Invention

This invention is directed to radial-ply tires and more particularly to such a tire aesthetically built for use in passenger cars.

2. Description of the Prior Art

Quality requirements for pneumatic radial tires have grown diverse and strict with respect to not only speedy, safe runnability and comfortable riding but also attractive appearance. Pattern designing of the tire tread and white lettering on the side tread are predominant from the stylish point of view. Such designs and letters, however, are difficult and tedious to maintain fully clear over long periods of time. In general, automotive tires are readily susceptible to staining, particularly at their sidewalls, with mud and dust during or after running or with dirt pickup while in storage.

A demand has been voiced, despite those circumstances, for radial tires of superior resistance to staining on the part of end users and of retailers for display.

SUMMARY OF THE INVENTION

The present invention seeks to provide a new radial-ply tire for use in passenger cars which is highly stain-proof per se, easy to clean even when stained and free from unsightliness and scarring without repetitive washing or waxing. More specifically, the tire according to the invention exhibits improved stain resistance at its sidewalls while in running or in storage, contributing to prolonged originality.

The above and other objects and features of the invention will be better understood from the following description.

According to the invention there is provided a radial-ply tire for passenger cars, which comprises a tread portion and two opposite sidewall portions each of the sidewalls being formed, at least or an outer surface thereof from a rubber composition comprising a vulcanizable rubber and an electrically conductive carbon black and having a volume resistivity of not more than $10^4$ $\Omega$cm.

DESCRIPTION OF THE PREFERRED EMBODIMENTS

The radial tire of the present invention is contemplated for use in passenger cars and is constructed with a tread portion and at least at its sidewalls from a rubber composition of a specified formulation.

Specifically, the rubber compositions useful for purposes of the invention should not be greater in volume resistivity than $10^4$ $\Omega$cm. A volume resistivity of $10^4$ $\Omega$cm is deemed to be extremely small and hence electrically conductive compared to the magnitude of about $10^8$ $\Omega$cm imparted by ethylene-propylene-diene rubber and halogenated butyl rubber in common use and also of about $10^6$ $\Omega$cm in conventional sidewalls.

Enhanced electrical conductivity targeted by the invention can be achieved only by the use of a selected base rubber blended with a selected carbon black of an electrically conductive type. This additive is distinguished in nature from carbon blacks commonly accepted in the art as reinforcing agents for rubbers. Such specific carbon black should have a surface area by nitrogen adsorption ($N_2SA$) of 100 to 150 $m^2/g$, a dibutyl phthalate adsorption (DBP) of 90 to 130 ml/100 g, a pH of 7.0 to 8.0 and a volatile content of 1.0 to 3.0. These parameters are determined in a manner to be described. The carbon black should be added in an amount of 5 to 25 parts by weight based on 100 parts by weight of the base rubber.

Surface Area by Nitrogen Adsorption ($N_2SA$) ($m^2/g$)

"Surface Area by Nitrogen Adsorption" is followed as stipulated by ASTM D-3037-78, Method C.

Dibutyl Phthalate Adsorption (DBP) (ml/100 g)

Measurement is made in accordance with JIS K-6221, 6.1.2(1), Method A, "Method of Testing Carbon Blacks for Rubbers".

pH

JIS K-6221, 6.4.2 is followed.

Volatile Content

JIS K-6221, 6.4.1 is followed.

Departures of $N_2SA$ and DBP from the above specified ranges will fail to provide a volume resistivity not exceeding $10^4$ $\Omega$cm and further make the resulting rubber mix less resistant to ozone and to crack. The electrically conductive carbon black if present in smaller amounts than 5 parts would not be effective in controlling the volume resistivity below $10^4$ $\Omega$cm and if present in larger amounts than 25 parts would invite mechanical weakness.

Base rubbers used herein may be selected for example from vulcanizable rubbers such as natural rubber, polyisoprene rubber, butadiene rubber, styrene-butadiene rubber and the like. They may be used alone or in combination. Butadiene rubber is preferred for its good flex resistance and when blended with any other rubber may conveniently be added in an amount of more than 30 parts by weight per 100 parts by weight of the blend.

The rubber composition according to the invention is admixed, in addition to an electrically conductive carbon black, with any conventional carbon black for reinforcement purposes. The latter additive to improves the tensile strength on break and elongation on break, but should not adversely affect the electrical conductivity of the final rubber mix. The reinforcing carbon black preferably has an $N_2SA$ of 20 to 90 $m^2/g$ and a DBP of 70 to 130 ml/100 g and ranges in amount from 30 to 65 parts by weight. Specific examples include high abrasion furnace black (HAF), fast extrusion furnace black (FEF), general purpose furnace black (GPF) and the like.

Two selected carbon blacks of electrically conductive and reinforcing types may be incorporated individually, concurrently or as a mixture into the rubber composition.

Various other additives may be employed in which are included vulcanization accelerators, vulcanization activators, sulfur, zinc oxide, metal salts of fatty acids, process oils, antioxidants, waxes and the like.

The invention will now be described by way of the following examples which are provided for purposes of illustration only. In all formulations the numerical figures are indicated in terms of parts by weight unless otherwise noted.

Different rubber compositions were prepared as formulated in Table 2 with the use of varying carbon blacks shown in Table 1. Tires of a 185/70R13 Y351 size were produced in which the test composition was applied to the sidewall. Performance evaluation was made of all the tires for ozone resistance, crack resistance, stain proofness and volume resistivity under the conditions given below and with the results shown in Table 2.

Ozone Resistance

JIS K-6301, 16 was followed in measuring degradation by the action of ozone.

Crack Resistance

The test method of JIS K-6301 was followed.

Stain Proofness

The test tire was placed on a passenger car and allowed to run at a distance of 5,000 km. Blackness of the sidewall was examined on a tester tradenamed Refrectometer TP-200 and manufactured by Tokyo Denso Co. The smaller numerical figure, the more vivid the blackness.

Volume Resistivity

Measurement was made on an ammeter tradenamed Potensiostat Galvanostat HA 104 and manufactured by Hokuto Denko Co. and a voltage indicator tradenamed Digital Electrometer TR 8652 and manufactured by Advantest Co. A test piece of 10 mm in width, 60 mm in length and 2 mm in thickness was secured with plus and minus terminals on opposite, longitudinal ends at a distance of 20 mm from the center. After a 60-second current flow, the voltage was read from which the volume resistivity was counted from the following equation.

$$P = (V \times s)/(i \times L)$$

where
P: volume resistivity
V: voltage after lapse of 60 seconds
s: cross-sectional area of test piece
i: current
L: distance between two terminals (20 mm)

Examples 1 and 2, inventive tires, have been found highly satisfactory in respect of all the physical characteristics tested.

Failure to meet the specified ranges of $N_2SA$, DBP and pH revealed reduced resistance to cracking as evidenced by Comparative Example 1. Comparative Example 2 in which $N_2SA$ and volatile content were outside the specified ranges was unacceptable in dynamic ozone resistance and crack resistance. To meet the pH requirement alone showed too high a volume resistivity, leading to severe staining

TABLE 1

| carbon black | $N_2SA$ (m²/g) | DBP (ml/100 g) | pH | volatile content |
| --- | --- | --- | --- | --- |
| VULCAN-XC-72[1] | 254 | 178 | 6.0 | 1.5 |
| VULCAN-PA-74[2] | 143 | 118 | 7.5 | 1.0 |
| VULCAN-C[3] | 125 | 100 | 8.0 | 1.0 |
| Mitsubishi 20B[4] | 56 | 115 | 8.0 | 0.4 |
| Mitsubishi CF9[5] | 60 | 65 | 8.0 | 0.7 |
| FEF HTC 100[6] | 42 | 115 | 7.5 | 0.6 |

[1] to [3] electrically conductive type, Cabot Co.
[4] to [5] electrically conductive type, Mitsubishi Kasei Co.
[6] fast extrusion furnace black, Chubu Carbon Co.

TABLE 2

| Run | | Control | Comparative Example 1 | Examples 1 | Examples 2 | Comparative Examples 2 | Comparative Examples 3 |
| --- | --- | --- | --- | --- | --- | --- | --- |
| Formulation | natural rubber | 40.00 | 40.00 | 40.00 | 40.00 | 40.00 | 40.00 |
| | butadiene rubber | 60.00 | 60.00 | 60.00 | 60.00 | 60.00 | 60.00 |
| | zinc oxide | 3.00 | 3.00 | 3.00 | 3.00 | 3.00 | 3.00 |
| | stearic acid | 1.00 | 1.00 | 1.00 | 1.00 | 1.00 | 1.00 |
| | antioxidant[1] | 2.00 | 2.00 | 2.00 | 2.00 | 2.00 | 2.00 |
| | microcrystalline wax | 3.00 | 3.00 | 3.00 | 3.00 | 3.00 | 3.00 |
| | FEF HTC 100 | 50.00 | 30.00 | 30.00 | 30.00 | 30.00 | 30.00 |
| | Vulcan-XC-72 | — | 20.00 | — | — | — | — |
| | Vulcan PA 74 | — | — | 20.00 | — | — | — |
| | Vulcan C (NOBS) | — | — | — | 20.00 | — | — |
| | Mitsubishi 20B | — | — | — | — | 20.00 | — |
| | Mitsubishi CF9 | — | — | — | — | — | 20.00 |
| | aromatic oil | 12.00 | 12.00 | 12.00 | 12.00 | 12.00 | 12.00 |
| | accelerator[2] | 1.00 | 1.00 | 1.00 | 1.00 | 1.00 | 1.00 |
| | sulfur | 1.60 | 1.60 | 1.60 | 1.60 | 1.60 | 1.60 |
| Side Tread Performance | ozone-resistance static | ○ | ○ | ○ | ○ | ◉ | ○ |
| | ozone-resistance dynamic | ○ | ○ | ○ | ○ | X | △ |
| | crack resistance | ○ | X | ○ | ○ | X | ○ |
| | stain proofness | 35.5 | 18.5 | 20.5 | 22.5 | 30.0 | 40.8 |
| | volume resistivity (Ωcm × 10⁴) | 23.0 | 0.03 | 0.01 | 0.33 | 2.1 | 500.0 |

[1] Antigen 6C
[2] Nocceller MSA-G
◉: highly excellent
○: excellent
△: fairly good
X: poor

What is claimed is:

1. A radial-ply tire for use in passenger cars, which comprises a tread portion and two opposite sidewall portions, each of said sidewall portions being formed, at least on an outer surface thereof, from a rubber composition comprising a vulcanizable rubber selected from the group consisting of natural rubber, polyisoprene rubber, butadiene rubber, styrene-butadiene rubber and combinations thereof and an electrically conductive carbon black having a surface area by nitrogen adsorption in the range of from 100 to 150 m²/g, a dibutyl phthalate adsorption in the range of from 90 to 130 ml/100 g, a pH in the range of from 7.0 to 8.0 and a volatile content in the range of from 1.0 to 3.0, said carbon black being present in an amount of from 5 to 25 parts by weight per 100 parts by weight of said rubber and said rubber composition having a volume resistivity of not more than $10^4$ Ωcm.

* * * * *